Patented May 18, 1926.

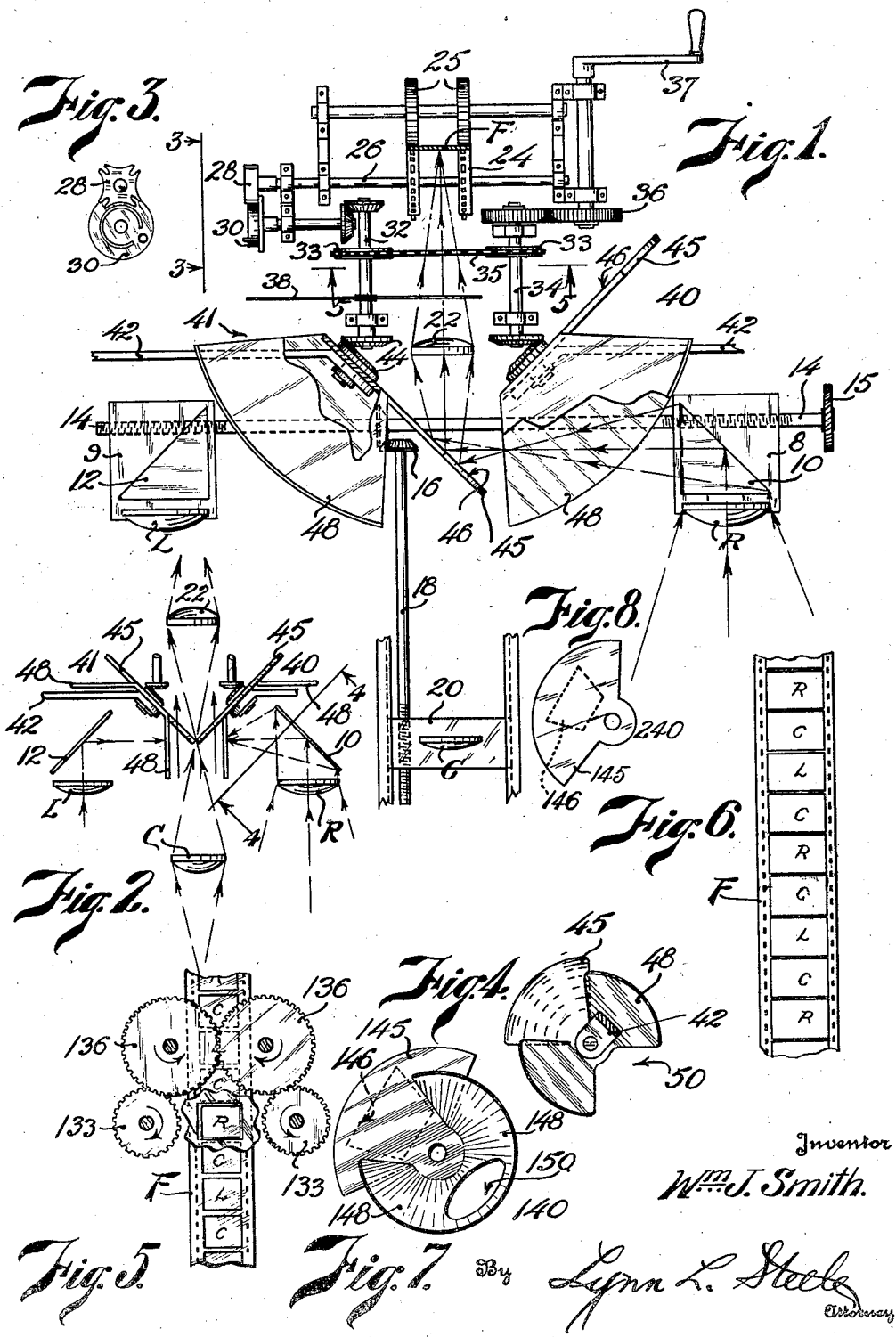

1,585,129

UNITED STATES PATENT OFFICE.

WILLIAM J. SMITH, OF DENVER, COLORADO.

STEREOSCOPIC MOTION-PICTURE CAMERA.

Application filed October 16, 1922. Serial No. 594,857.

The object of this invention is to provide a camera for motion picture work which will produce films such that when reproduced on the screen will make the images appear to stand out in sharp relief, thereby taking the flatness out of the projected pictures and causing them to appear more natural.

Briefly the invention comprises spaced object lenses for the purpose of taking the pictures from slightly different angles. Rays of light from all the object lenses are adapted to be reflected or refracted to the same focusing lens. Movable means are interposed between the focusing lens and certain of the object lenses for bringing the rays from said object lenses into proper alinement with the focusing lens. If desired these moving means may also serve as shutters for the camera, thereby eliminating the necessity for separate shutter devices. Preferably three object lenses are employed, these being right, left and center lenses, the right and left lenses being spaced equidistantly from the center lens. The center lens serves as a rectifier and presents the usual flat picture, while the right and left lenses take pictures from opposite sides of the center line to produce the stereoscopic effect. Thus when images made on a film from the three lenses successively, are projected on a screen in the usual manner, these images appear successively on the screen with the center-lens pictures alternating between those from the right and left lenses, the order of projection with respect to the original lenses being right, center, left, center, right, center and so on. This gives to the observer's eye the effect of a natural view of the original subject, the result being due to the effect of the third dimension, or depth, produced by the three sets of pictures.

In the accompanying drawings wherein certain embodiments of the invention are disclosed by way of illustration, Fig. 1 shows diagrammatically the arrangement of the parts in operative relation, the view from the right lens being thrown on the film and those from the other lenses being cut off;

Fig. 2 is a similar view showing the passage of light from the center lens to the film the other lenses being cut off;

Fig. 3 is an elevational detail of the film-actuating mechanism taken from line 3—3 of Fig. 1;

Fig. 4 is a face view of one of the primary shutters or combined shutter and reflector elements of Figs. 1 and 2 taken from line 4—4 of Fig. 2;

Fig. 5 is a modification of the shutter driving mechanism which might be substituted for that at position 5—5 of Fig. 1 for driving the shutters in opposite directions instead of in the same direction;

Fig. 6 is a view of a piece of film showing the relation of the exposures taken through the right, left and center lenses;

Fig. 7 is an elevation of a modified form of shutter and reflector adapted to perform all shutter requirements including the intervals of film actuation;

Fig. 8 shows a further modification for like purposes.

The drawings disclose a camera arrangement of the present invention having the right lens R, the left lens L and the center lens C, lens R being mounted in a frame 8 carrying a reflector or refractor 10 and the lens L being mounted in a frame 9 carrying a similar reflector or refractor 12. Frames 8 and 9 are carried on a right and left threaded shaft 14 operable by a knob 15 for drawing lenses R and L closer together and separating them. Shaft 14 through bevel gears 16 drives a second shaft 18 for simultaneous adjustment of the frame 20 which carries lens C in order that the distances of the various lenses along the paths of the light rays from the focusing lens 22 may be equal. Thus the positions of the object lenses with respect to the focusing lens may be controlled as desired.

The rays of light passing through the focusing lens 22 impinge on the film F held between the actuating gears 24 and rollers 25 or the like. The film-actuating gear wheels 24 are mounted upon and driven by a shaft 26 which is in turn driven by the parts 28 and 30 of a Geneva movement geared up with a shaft 32. Shaft 32 is driven from a shaft 34 through the medium of gears 33 and a chain 35, the shaft 34 being driven by a gear train 36 and crank 37 or the like. If required a shutter 38 may be mounted upon and driven by shaft 32, this secondary shutter 38 being interposed between the film F and the focusing lens 22 to cut off light from the film during movement of the latter.

Right and left combined reflectors and shutters 40 and 41, carried on brackets 42, are driven through bevel gears 44 by the shafts 32 and 34. These primary shutters and reflectors 40 and 41 are adapted to rotate to bring flat sections 45 thereof into the paths of the rays from the various lenses and refractors or reflectors 10 and 12. The inner faces 46 of the sections 45 are reflecting faces and are for the purpose of directing rays from the members 10 and 12 to the focusing lens 22. When in the position shown in Fig. 1, the backs of these sections serve to intercept rays from the center lens and from the opposite member 10 or 12. Opposite the flat section 45 an opening 50 is provided for passage of the rays from the one reflector or refractor 10 or 12 to the interposed reflecting face 46. Between the flat section 45 and the opening 50 opposed sections 48 in the form of wings are disposed at angles of about 45 degrees. When the primary shutters 40 and 41 are in the position of Fig. 2 the wings 48 are in position to permit passage of light between them from the center lens C to the focusing lens 22, and at the same time intercept light coming from the lenses L and R. The openings 50 permit passage of the section 45 whether the shutters are rotated in the same direction as by the gears 33 and chain 35 of Fig. 1 or in the opposite directions as by the train of gears 133 and 136 shown in Fig. 5.

A modified form of primary shutter and reflector 140 is shown in Fig. 7, the construction being such that all light rays will be intercepted by the pair of shutters when the film is being moved. In this manner the secondary shutter 38 between the focusing lens 22 and the film F may be dispensed with. Each of this type of shutter has a flat section 145 of greater than 90° arc, so that the ends of the sections 145 of the cooperating pair intercept all light from the film when the film is moving. The rest of the original disc from which the shutter is formed is bent up at approximately 45° from the plane of section 145 about as indicated and is provided in its middle portion with an aperture 150 for the passage of light from the respective lens R or L to the reflecting face 146 on the inner side of section 145 of the opposite shutter. The side portions 148 of the bent up section serve to cut off light from the side lenses R and L and to permit passage of light between them from the center lens C to the focusing lens 22 as in the other form. The axes of the two shutters may be at right angles as shown.

In Fig. 8 a further modification of reflector and shutter 240 is shown. Here only the flat intercepting section 145 is employed, the reflecting face 146 on one side thereof being used as in the form of Fig. 7. A pair of such shutters wherein the section 145 has an arc of greater than 90° and less than 180°, serve all shutter purposes for controlling admission of light from the proper object lens to the focusing lens and for cutting off light from all the object lenses when the film is being moved. When this form of shutter is employed, the usual non-reflecting finish of the interior of the camera is employed so that rays passing across the path of light of lens C from lenses R and L will be absorbed, scattering rays if present being taken care of by any suitable intercepting means out of the path of the primary shutters 240 and out of the path of rays to the focusing lens 22.

As shown in Figs. 7 and 8, the arc of the sections 145 is about 120°, this being satisfactory for proper light control as described.

With constructions described and shown, a film is produced as indicated in Fig. 6, wherein images formed by rays of light from the center lens C alternate with those from the other two lenses R and L. Thus the order of images is right, center, left, center, right, center, left, center, and so on. In this manner the images from the center lens which produces the normal flat picture serve to rectify the stereoscopic effect produced by the images of the other lenses, the result being a smooth uniform effect upon the eye of natural vision of the original subject.

Inasmuch as reflectors and refractors can ordinarily be used interchangeably, these terms are used in this specification and claims interchangeably and such scope is intended.

I claim:

1. A motion picture camera comprising spaced object lenses, a common focusing lens, and continuously rotary means for directing rays from the object lenses to the focusing lens.

2. A motion picture camera comprising spaced object lenses, a common focusing lens, and continuously moving means for directing rays from the object lenses to the focusing lens.

3. A motion picture camera comprising spaced object lenses, a common focusing lens, and continuously moving means for intermittently directing rays from the object lenses to the focusing lens.

4. A motion picture camera comprising spaced object lenses, a common focusing lens, and a pair of members movable in separate fixed planes, adapted to be moved intermittently into position to direct rays from the object lenses selectively to the focusing lens.

5. A motion picture camera comprising spaced object lenses, a common focusing lens, and means adapted to be moved transversely of the light rays into position to intermittently direct rays from the object lenses to the focusing lens.

6. A motion picture camera comprising spaced object lenses, a common focusing lens, and a pair of members rotary on independent axes for directing rays from the object lenses to the focusing lens.

7. A motion picture camera comprising spaced object lenses, a common focusing lens, and a pair of continuously rotary members for directing rays from the object lenses to the focusing lens.

8. A motion picture camera comprising spaced object lenses, a common focusing lens, and a pair of members having reflecting surfaces whose planes are movable transversely of the axes of the light rays for intermittently directing rays from the object lenses to the focusing lens.

9. A motion picture camera comprising spaced object lenses, a common focusing lens, and a pair of members rotary on independent axes having reflecting faces adapted to be moved into position intermediate the object lenses for directing rays from the object lenses to the focusing lens.

10. A motion picture camera comprising spaced object lenses, a common focusing lens, and a pair of rotary members having independent axes disposed at acute angles to the axis of the focusing lens and lying intermediate the object lenses, said members having reflecting faces for directing rays from the object lenses to the focusing lens.

11. A motion picture camera comprising spaced object lenses, a common focusing lens, and a pair of rotary shutters set at angles to the axis of the focusing lens and having light intercepting sections of greater than 90° arc and less than 180° arc provided with reflecting faces for directing rays from the object lenses to the focusing lens.

12. A motion picture camera having spaced object lenses and a center object lens, a common focusing lens, and means adapted to be moved into position for intermittently cutting off rays from the center lens and directing rays from the spaced lenses to the focusing lens, and movable to permit passage of rays from the center lens to the focusing lens intermittently.

13. A motion picture camera having spaced right and left object lenses, a center object lens, a common focusing lens, and a pair of reflecting shutters movable into positions for intermittently cutting off rays from the center lens and directing rays from the right and left lenses to the focusing lens, and movable from such directing positions to permit passage of light from the center lens to the focusing lens.

14. A motion picture camera having spaced right and left object lenses, a center object lens, a common focusing lens, and a pair of reflecting shutters movable for intermittently reflecting rays from the right and left lenses and permitting light to pass from the center lens to the focusing lens.

15. A motion picture camera having spaced right and left object lenses, a center object lens, a common focusing lens, and a pair of reflecting shutters movable for intermittently reflecting rays from the right and left lenses to the focusing lens and permitting light to pass from the center lens to the focusing lens, said shutters having means for cutting off light from the right and left lenses when light is passing from the center lens.

16. A motion picture camera having spaced right and left object lenses, a center object lens, a common focusing lens, and a pair of members movable in separate fixed planes for selectively controlling the passage of rays from the various object lenses to the focusing lens.

17. A motion picture camera having spaced object lenses, a center object lens, a common focusing lens, and a pair of rotary shutters having separate axes disposed at angles to the axis of the focusing lens and having reflecting faces, said shutters intermittently intercepting rays from the center lens and reflecting rays from the spaced lenses to the focusing lens and movable from such reflecting positions for passage of rays from the center lens to the focusing lens.

18. A motion picture camera having spaced object lenses and a center object lens, a common focusing lens, means for selectively controlling the passage of light from the various object lenses to the focusing lens, and means for simultaneously adjusting the positions of the various object lenses with respect to the focusing lens.

19. A motion picture camera having spaced object lenses, a center object lens, a common focusing lens, and a pair of rotary members having separate axes for selectively directing rays from the spaced lenses to the focusing lens while cutting off rays from the center lens and for permitting passage of rays from the center lens to the focusing lens.

20. A motion picture camera having spaced object lenses, a center object lens, a common focusing lens, and rotary means for selectively directing rays and controlling passage of rays from the various lenses to the focusing lens, said means comprising an intercepting face of greater than 90° arc for intercepting light rays during movement of a film receiving the images.

21. A motion picture camera having spaced object lenses, and a common focusing lens, and a pair of rotary shutters having separate axes at angles to the axis of the focusing lens, each shutter having an intercepting surface of greater than 90° arc for intercepting all light during movement of a film receiving the projected images.

22. A motion picture camera having spaced object lenses, a center object lens, a common focusing lens, and a pair of rotary members having separate axes for selectively directing and controlling rays from the various object lenses to the focusing lens.

23. A motion picture camera having spaced object lenses, a common focusing lens, and members rotary in separate fixed planes having reflecting surfaces adapted to pass edge-wise across rays of light passing from the object lenses to the focusing lens.

24. A motion picture camera having spaced object lenses, a common focusing lens, and a pair of members continuously rotary in separate fixed planes having axes at angles to the axis of the focusing lens and having reflecting surfaces adapted to pass edge-wise across rays of light passing from the object lenses.

25. A motion picture camera having spaced object lenses, a common focusing lens, and a pair of rotary shutters revolving in separate fixed planes angular to the axis of the focusing lens for intercepting rays from the object lenses and provided with reflecting surfaces for directing rays alternately from the object lenses to the focusing lens.

26. A motion picture camera having spaced object lenses, a common focusing lens, and a pair of continuously rotary shutters revolving on separate axes in fixed angular planes for intercepting rays of light and having reflecting faces for directing rays alternately from the object lenses to the focusing lens.

27. A motion picture camera having spaced object lenses and a center object lens, a focusing lens, and means for permitting light rays to pass alternately from said object lenses to the focusing lens.

28. A motion picture camera having spaced object lenses, a center object lens, a focusing lens, means for permitting light rays to pass alternately from the object lenses to the focusing lens and means for intercepting rays from the lenses not to be used.

29. A motion picture camera having spaced object lenses, a rectifying object lens, a common focusing lens, and means for directing and controlling the passage of light from the various object lenses to the focusing lens.

In testimony whereof I affix my signature.

WM. J. SMITH.